United States Patent [19]

Chen

[11] Patent Number: 4,749,147
[45] Date of Patent: Jun. 7, 1988

[54] MONO-MOTOR DRIVEN, BI-DIRECTIONALLY OPERABLE 8-MM VIDEO TAPE-WINDING DEVICE

[76] Inventor: Tonny Chen, No. 52, Lane 563, Chang Ts'ao Road, Changhua City, Taiwan

[21] Appl. No.: 927,714

[22] Filed: Nov. 7, 1986

[51] Int. Cl.$^4$ .............................................. G03B 1/04
[52] U.S. Cl. ................................... 242/201; 242/200
[58] Field of Search ............. 242/200, 201, 202, 203, 242/204, 208; 360/73, 74

[56] References Cited

U.S. PATENT DOCUMENTS

| | | | |
|---|---|---|---|
| 3,894,702 | 7/1975 | Okano | 242/201 |
| 4,031,554 | 6/1977 | Umeda | 242/201 X |
| 4,167,257 | 9/1979 | Clarridge | 242/201 |
| 4,178,809 | 12/1979 | Hanzawa et al. | 242/201 X |
| 4,358,800 | 11/1982 | Shimizu et al. | 242/201 X |
| 4,533,092 | 8/1985 | Cecchi et al. | 242/200 X |
| 4,591,935 | 5/1986 | Kowda | 242/201 X |
| 4,711,410 | 12/1987 | Gwon | 242/200 X |

Primary Examiner—Donald Watkins
Attorney, Agent, or Firm—Browdy and Neimark

[57] ABSTRACT

A drive mechanism and control means for a bi-directionally operable 8-mm-video tape winding device which includes an electric circuit for actuating a motor to drive gears engaging a rack member pivotally attached to the underside of a slide board which, through cooperating means, permits starting winding before the winding direction is set and which further includes a clutch device associated with control buttons and tension sensing means to control the winding speed and direction of the tape winding device.

6 Claims, 5 Drawing Sheets

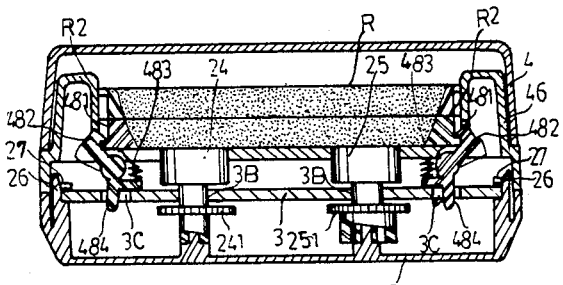
FIG.4-A
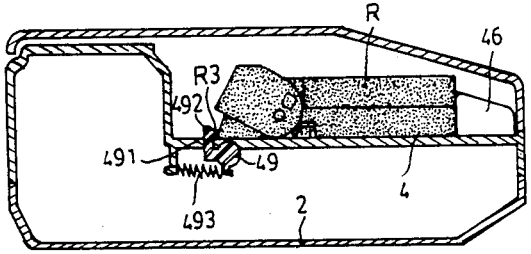
FIG.4-B
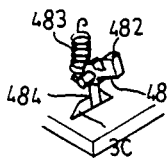
FIG.4-C
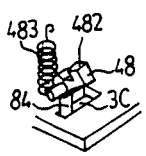
FIG.4-D
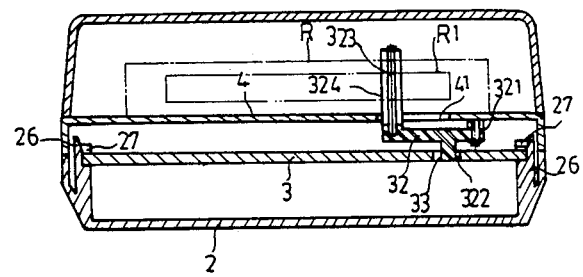
FIG.5-A
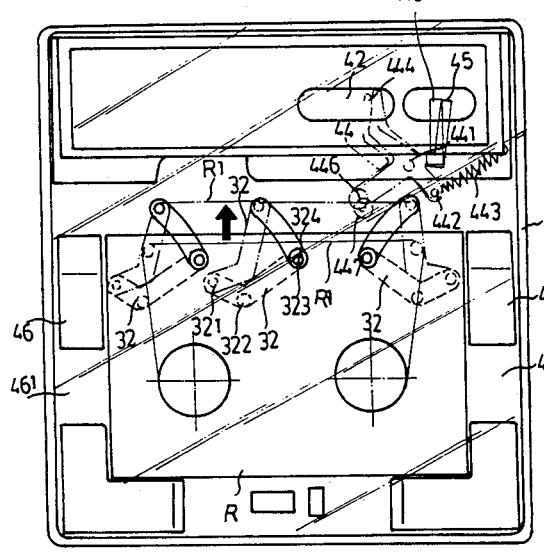
FIG.5-B
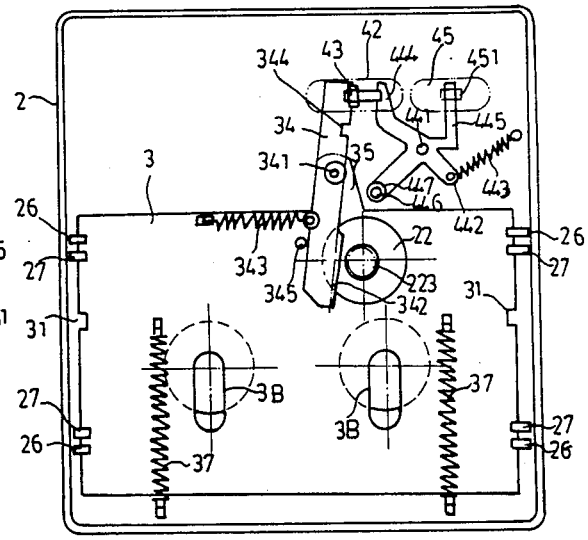
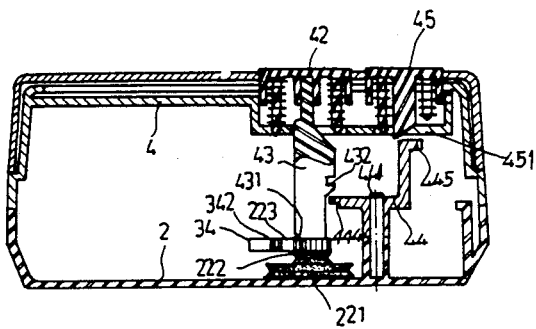
FIG.6-A

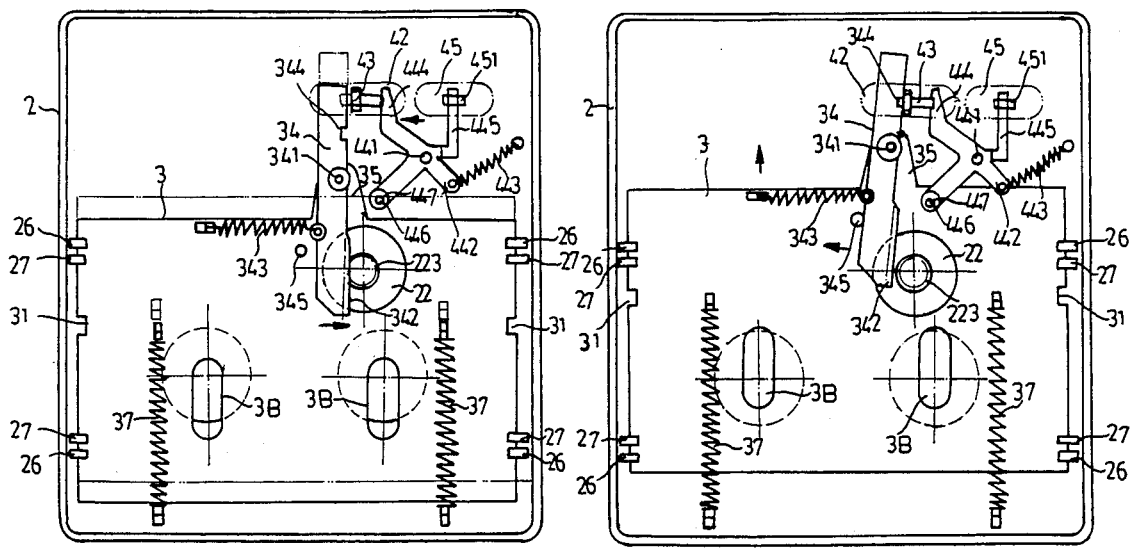
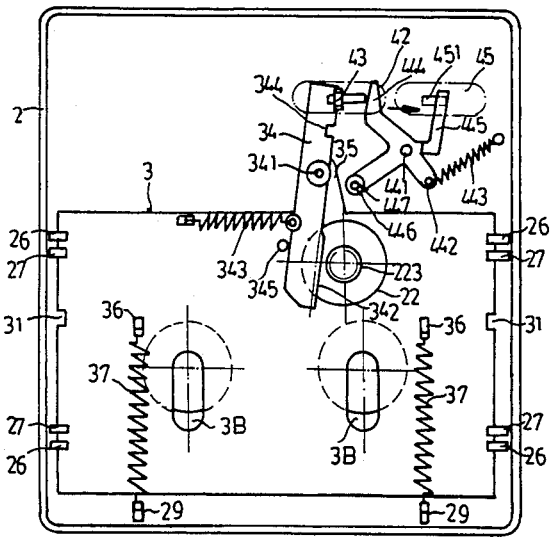
FIG.6-B
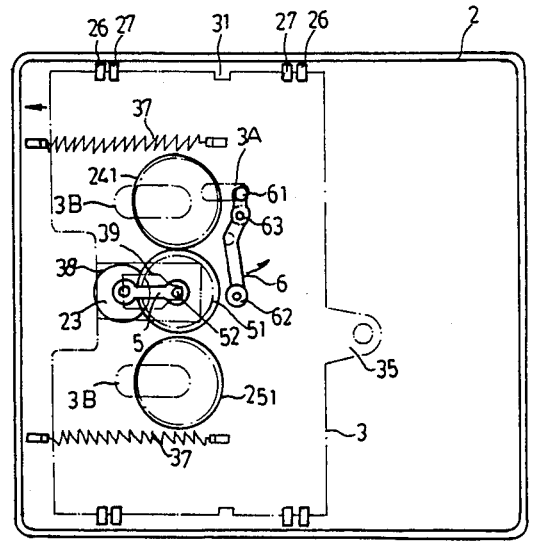
FIG 6-C
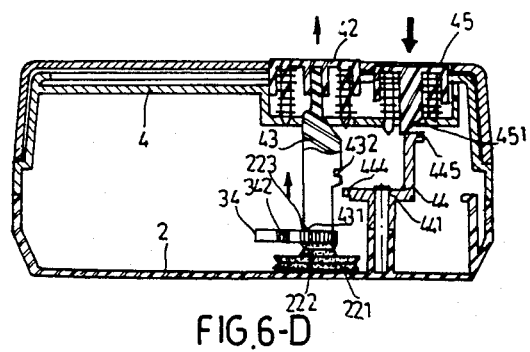
FIG.6-D
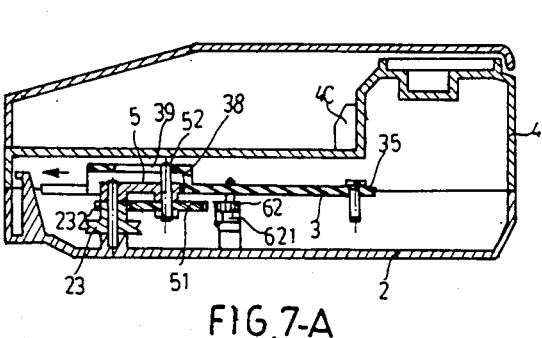
FIG.7-A

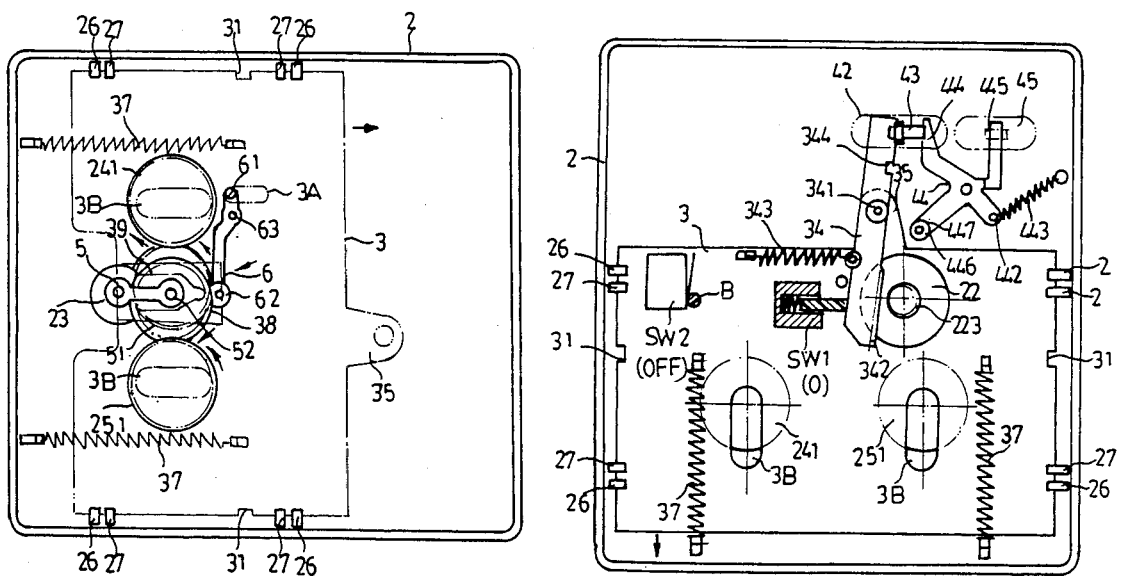
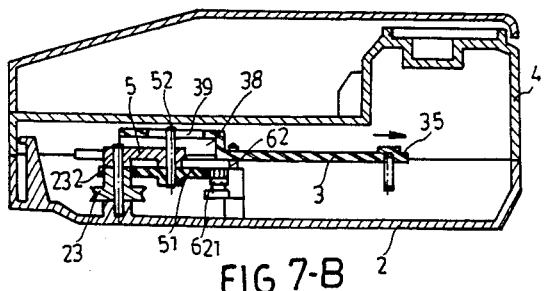
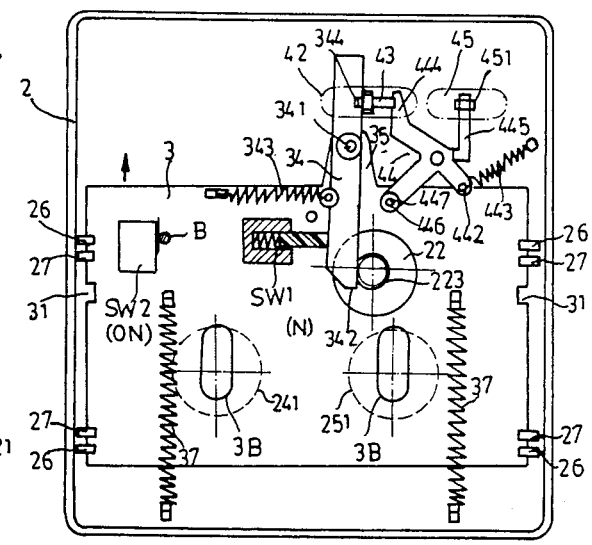
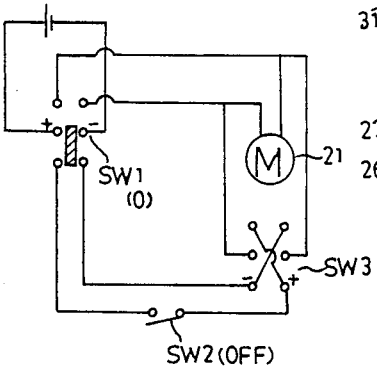
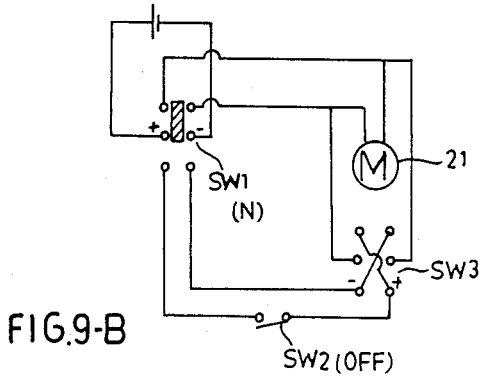
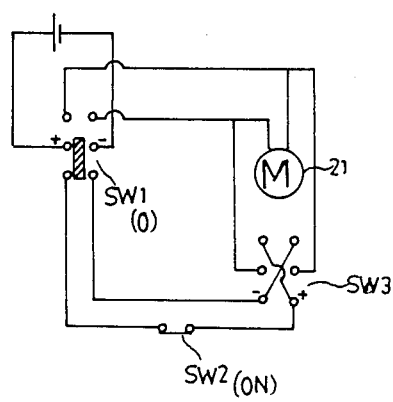

MONO-MOTOR DRIVEN, BI-DIRECTIONALLY OPERABLE 8-MM VIDEO TAPE-WINDING DEVICE

SUMMARY OF THE INVENTION

The present invention is concerned with a mono-motor driven, bi-directionally operable 8-mm tape winding device, and more particularly to a tape winding device specifically adapted for 8-mm tape cassettes, which is single-motor powered, mono-button controlled and bi-directionally operable, and is a provided with an electric circuit to controllably actuate a motor so as to drive a gear which then accordingly moves a rack, pivotably disposed under the side of a slide board which is slidably fixed between a cassette mounting seat and a base, so that a number of tape-pushing elbow arms are able to be actuated in synchronism with the moving slide board to push out a section of an 8-mm tape from a located cassette for initiating a tape winding operation, before a winding direction is selected.

To effect the movements of tape out-pushing, winding, auto stop or manual stop, a clutch means is provided between the rack member and a pressing key disposed under a start button, so to achieve an automatic opreation; an engaging & disengaging means is provided on the side of said pressing key, working in cooperation with a four-way operation element located under a stop button, so as to effect a control of the present invention.

In accordance with the modern design ideas featured by "light", "thin" and "compact" characteristics, and to comply with the development of increasingly small video players, the tape cassettes are manufactured smaller and smaller in size, starting from the VHS and BETA cassettes, which are employed prevalently at present, to a VHS-C cassette, only one-third of the size of a VHS cassette, and now to an 8-mm video cassette, even smaller in size than a VHS-C cassette; due to the different sizes of the said cassettes, it becomes impossible to exchangeably apply those cassettes to various video recorders or players as well as tape winding devices; besides there are many different operational characteristics associated with each kind of cassette, such as features of cassette opening move, tape winding operation, and therefore various serving mechanisms are adopted to meet the different requirements; as 8-mm cassettes were launched just in recent years, and the tape winding devices thereof have still been in development, there is much room left for further improvement on these devices.

There are no roller elements provided at the front of an 8-mm cassette, where the magnetic tape of the 8-mm cassette rotarly pass through, however, in VHS, BETA, VHS-C cassettes, such roller elements are equipped, in order to prevent the magnetic tape from being damaged during its winding operation, and a move of pushing out a section of an 8-mm magnetic tape before winding operation becomes essential. Because of such difference in structure, an 8-mm tape winding device naturally becomes more complicated in its structure than those for VHS, BETA and VHS-C cassettes. Due to such complicated operations in an 8-mm tape winding operation, existing 8-mm tape winding devices have mostly adopted two or multiple motors to work in cooperation with electric circuit means for effecting sequence control. The complicated structures of conventional 8-mm tape winding devices are vulnerable to malfunction and make the operation thereof relatively complex, and furthermore, the adoption of at least two motors to operate a conventional 8-mm tape-winding device can cause relative high power consumption and also raise the production cost, and make the commercial products less competetive.

Therefore, the primary object of the present invention is to provide a mono-motor driven, bi-directionally operable 8-mm video tape winding device which adopts mechanisms to effect basic procedures of tape-winding operation which includes tape-pushing out, tape-winding, auto stop and manual stop steps, and is also equipped with an electric switching circuit working in cooperation with a fixed mechanical mechanism so to precisely and readily effect an 8-mm tape cassette winding operation.

Another object of the present invention is to provide a mono-motor driven, bi-directionally operable 8-mm tape winding device which is characterized by its adoption of a single motor as a driving power to actuate the movable parts thereof so to effect a mechanical sequence control of the operation of the winding device with the aid of an electric circuit, so to simplify the structure of the device and lower the production cost, and increase the security of operation.

Hereinafter, the details of the structure, operation modes and features of the present invention are illustrated with the accompanying drawings, in which:

BRIEF DESCRIPTION OF THE DRAWINGS

FIG. 4-A is a side view of a tape cassette fixed in place.

FIG. 4-B is a view showing a tape cassette being fixed in place by a cassette-fixing hook located at the front thereof;

FIG. 4-C is a view showing the cassette-fixing hook being restrainedly located in a trapezoid-shaped opening on a slide board in position (1);

FIG. 4-D is a view showing the cassette-fixing hook being shifted to a new position (2) in the trapezoid-shaped opening;

FIG. 5-A is a sectional view showing the structure and location of a tape-push elbow arm;

FIG. 5-B is a view showing the tape-push elbow arm being in an operation mode;

FIG. 6-A is the first view showing the operation of the slide board;

FIG. 6-B is the second view showing the operation of the slide board;

FIG. 6-C is the third view showing the operation of the slide board;

FIG. 6-D is the fourth view showing the operation of the slide board;

FIG. 7-A is the first view showing the selection of clockwise or counter-clockwise operation of the present tape winding device;

FIG. 7-B is the second view showing the selection of clockwise or counter-clockwise operation of the present tape winding operation;

FIG. 8-A is the first view showing the location and operation mode of the start switch SW1 and the slight motion switch SW2;

FIG. 8-B is the second view showing the location and operation mode of the start switch SW1 and the slight motion switch SW2;

FIG. 9-A is the first view showing the electrical switching operation;

FIG. 9-B is the second view showing the electrical switching operation; FIG. 9-C is the third view showing the electrical switching operation.

DETAILED DESCRIPTION

Figure 1:
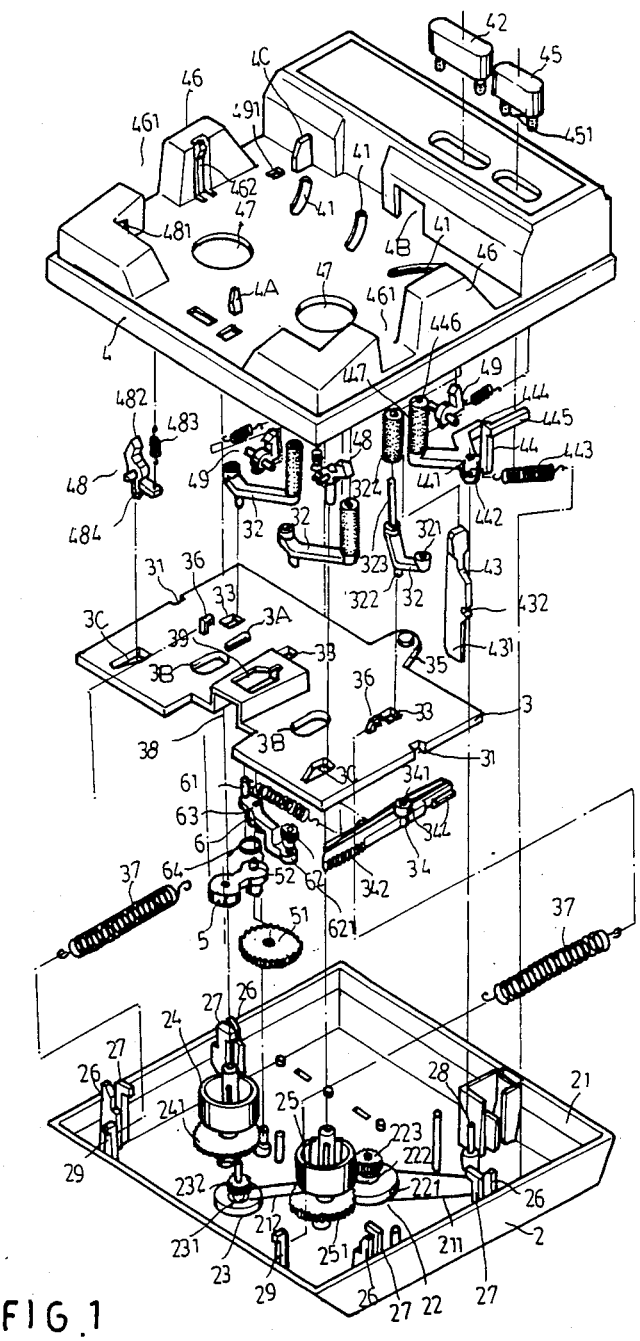
FIG. 1 is the perspective view of the exploded structural components of the present invention.
Figures 2, 3:
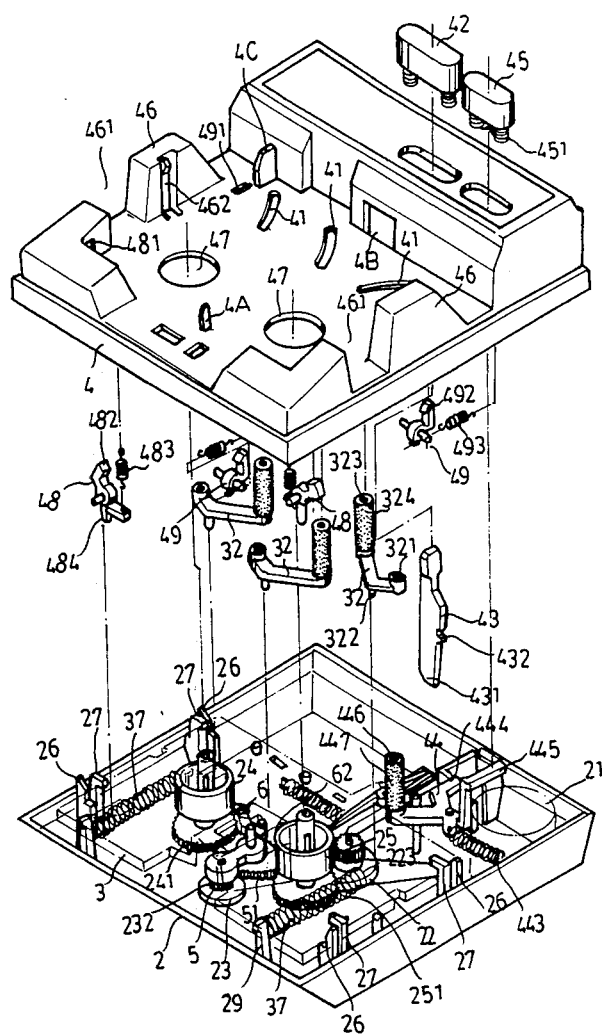
FIG. 2 is a perspective view showing the halfly assembled and halfly exploded components of the present invention.
FIG. 3 is a perspective view of the assembly of the present invention.

Referring first to FIG. 1, 2 and 3, the mono-motor driven, bi-directionally operable 8-mm tape winding device mainly comprises a base 2, a slide board 3 slidably disposed thereabove, and a cassette mounting seat 4 placed to cover said associated-linked base 2 and slideboard board 3 thereunder; the base 2 is defined in the form of a square concaved case in which a motor 21 is located at one corner thereof, in driving association with a relay drive disk 22 located slightly off the center of the base 2, by means of a drive belt 211. The relay drive disk 22 is constructed in a 3-stage form, the bottom stage 221 is in drive engagement with a belt 211, and the middle stage 222 is then associated with a drive member 231 of the drive disk member 23 by a drive belt 212 to transmit power. Gear 223 placed at the top stage of said relay drive disk 22 is employed to actuate the slide board 3 to slide, and the gear 232 located at the top of said drive disk member 23 and working in combination with a shiftable gear 51 which can selectively engage with the gear 241 or 251 of the left reel 24 and right reel 25 respectively, permitting the same to engage clockwise and counter-clockwise spinnings, thereby the mono-motor driven purpose is achieved.

Slide board 3 is in a square form, and is back and forth slidably supported on the top of said base 2 by means of four pairs of support elements 26 and restraint elements 27, located in juxtaposition to each other along the two opposite sides thereof.

Said restraint element 27 is shaped in a reverse L form and said support element 26 is correspondingly created to have a cutway for holding said slide board 3 thereon, and the slide board 3 has such a thickness that it can just slidably fit in the place defined by the cutway portion of said support element 26 and said reverse L-shaped restraint element 27 as shown in FIG. 4-A. For fitting the slide board 3 into said fitting place, a recessed cut 31 is defined on each side thereof respectively.

The adoption of said slide board 3 is to meet the operation requirement of an 8-mm tape cassette, in which a section of the magnetic tape must be pulled outward for winding purpose; for smooth and quick operation and avoiding damage to said magnetic tape, three tape-push elbow arms 32, operated in two opposite directions, are disposed on said base 2. See FIG. 1 to FIG. 3 along with FIG. 5A and FIG. 5B for the structure, location and function of the elbow arms 32. Said elbow arm 32 is mainly defined by an elbow-shaped embodiment at the bottom side of which is disposed a pin element 322 that is inserted in the hole 33 on said slide board 3 for actuating purpose, furthermore, a vertically-raised tape-push pole 323 is located at one end thereof to which a cylindrical sleeve 324 is freely movably attached, and a bore 321 is placed at the opposite end thereof, in which a pin is located so that the elbow arm is pivotably linked to the bottom side of said cassette mounting seat 4. The sleeve-attached tape-push pole 323, sticking out of a correspondingly-arranged arcuate movement-limiting opening 41 on said cassette mounting seat 4, is guided to swing along the arcuate path thereof on the slide board 3 being forward pushed; said swinging movement is produced as a result of the pivotal movement, centered at the pin located in said bore 321, when said slide board 3 is pushed forward along with the pin element 322 simultaneously which then effects the pivotal movement. When an 8-mm video cassette R is disposed on the cassette mounting seat 4, the elbow arms 32 are in a position just behind a section of the magnetic tape R1 as shown in FIG. 5-B, so that the forward-moved pole 323 can be smoothly in contact with said tape R1 owing to said rotatably actuated sleeve element 324 and push said magnetic tape R1 to the front end of said arcuate movement-limiting opening 41 without causing damage and with equally-balanced force due to the adoption of the three elbow arms 32.

The forward and backward sliding movement and fixing at position of said slide board 3 are achieved by means of an elongated rack member 34 which engages with the drive gear 223 disposed at the top of a relay drive means 22, and is located on the underside of said slide board 3. The control of operation of said elongated rack member 34 is carried out by a pressing key 43 extending under a start button 42 which is set at the front end of said cassette-mounting seat 4, the structure and operation mode of the above-mentioned components being best understood from FIG. 1 to FIG. 3 along with FIG. 6-A, 6-B, 6-C and 6-D. The rack member 34 is shaped in an elongate form and has a pivot hole 341 at the middle thereof so that the rack member 34 can be pivotably secured by a pin to said slide board 3 at the front protrusion 35 thereof; on one side of the front end of said rack member 34 is provided a toothed surface 342 which can be engaged with the drive gear 223 of said relay drive means 22, and a spring 343 is attached to the opposite side thereof to exert a pull force thereon so to be able to disengage said toothed surface 342 from said drive gear 223 in an inoperative situation.

The top end of said pressing key 43 is coupled to the underside of the start-button 42 which is installed at the front portion of said cassette mounting seat 4, and the bottom end of said key 43 is shaped in a partially oblique facet 431, as shown in FIG. 6-A, which is in abutment contact with the rear side of said rack member 34. When power is supplied, motor 21 is driven with the start button 42 depressed, the pressing key 43 is accordingly moved downward, making the oblique facet 431 push against the rear side of said rack member 34 so to pivot the same and cause the toothed surface 342, disposed at the front end thereof, to engage with the clockwisely rotating gear 223 so that the rack member 34 is actuated to move forward along with the slide board 3 as well as the three elbow arms 32 at the same time as shown in FIG. 6-A, and the direction of rotation of said gear 223 is under electrical control; in such a manner, the elbow arms 32 are able to carry out the tape-push performance. There is a keyway 344 disposed at the same side of the toothed surface 342 on the rack member 34, which can engage with the thick side of said pressing key 43 when the rack member 34 is being continuously pushed by gear 223 forward, as shown in FIG. 6-C; in the meanwhile, spring 343 is exerting a pull force on the rackmember 34 to cause it come into contact with a stop protrusion 345 so that the toothed surface 342 is made to disengage from said gear 223 to terminate the further sliding movement of said slide board 3, and simultaneously the tape-pushing act has also been carried out as shown in FIG. 5-B. After the above-mentioned moves are completed, the tape-winding operation is then started by means of an electrical switch means and a clockwise and counter clockwise rotation selecting switch means, the detailed description of the tape-winding operation being presented being.

As shown in FIG. 1 through FIG. 3 and FIG. 6-A, 6-B, 6-C and 6-D, in cooperation with the pressing key 43, disengaging said rack member 34 from said rotating gear 223, a locking means must be provided, i,e., a means to keep the pressing key 43 to lock against said inoperative rack member 34, and also to be able to terminate the lock state either in the middle or at the end of a tape-winding operation.

In order to effect the above-noted purpose, a four-way operation element 44 is adopted and placed next to said pressing key 43 and pivotably mounted on a vertical pole 28 which is disposed at the front portion of said base 2; wherein said four-way operation element 44 is freely pivoted about the vertical pole 28 which is secured to said element 44 through a hole 441 thereon. A spring-hooking element 442 is set as one branch of said four-way operation element 44 so that a spring, having one end attaching to said hooking element 442 and the other secured to the wall of said base 2, is employed to make one detent branch 444 of said operation element 44 in constant push contact with one side of said pressing key 43; at the middle of said pressing key 43 is disposed a recessed keyway 432, as shown in FIG. 6-B, into which the side of said detent branch 444 can engage when said pressing key 43 is being pushed downward, with the assistance of the said spring 443, so that the pressing key 43 is locked in place without further moving. In order to permit the winding device to stop in the middle of operation, a vertically-erected actuation stick 445 is branched out of said four-way operation element 44, which is operated by a stop button 45, located next to said start button 42 and having a protruding member disposed thereunder with an oblique bottom facet 451 which locates just above the top end of said actuation stick 445, as shown in FIG. 6-C. In the middle of a tape-winding operation, if an instant stop of the move is required, the stop button 45 is then depressed to cause the oblique bottom facet 451 come into abutment against the top end of said stick 445 and continuously to act on it so that the four-way actuation element 44 is made to clockwise rotate, releasing said detent branch 444 from the keyway 432 of said pressing key 43 and permitting the same to jump upward due to the exertion of the spring force. In the meantime the pressing key 43 also disengages from the keyway 344 of said rack member 34 so that the slide board 3 is pulled back to assume its original inoperative position, as shown in FIG. 6-D, by a pair of symmetrically placed springs 37, each having one end attached to hook 36 on said slide board 3 and the other to hook 29 on the wall of said base 2.

Also an automatic stop means is provided on said four-way actuation element 44, which includes a vertical pole 446 attached with a sleeve element 447, which sticks out of an opening 4B, as shown in FIG. 3, and is located in front of said arcuate movement-limiting openings 41. Referring to FIG. 5B, when a section of the magnetic tape R1 is outward pushed by said elbow arms 32, in winding or non-winding event, said tape R1 is not very tensionally extended, and said vertical pole 446 along with said sleeve element 447 is in light contact with said tape R1 and said tape R1 is slightly in arcuate form (indicated by the dot-dash lines); however, at the end of either clockwise or counter-clockwise tape-widning operation, the wound tape R1 is tensionally drawn by the rotating reels 24, 25 and the tension on said tape R1 push said four-way actuation element 44 backward, producing the same effect of the depression of said stop button 45, thereby the automatic stop of the tape-winding device at the end of operation is effectively accomplished.

To effect the purpose of forward and backward winding of the magnetic tape R1, a convex tunnel-like structure 38 is erected at the middle of said slide board 3, on the roof of which is defined a movement-confining opening 39 that is so shaped to limit the movement of a freely shiftable idler 51, as shown in FIGS. 1, 2, 3, and FIGS. 7-A, 7-B.

Said shiftable idler 51 is rotatably mounted on the front end of a gear-engaging means 5, and the other end of which is fixed on the top of said drive disk member 23 by an axis pole 233, in such arrangement that the shiftable idler 51 can engage with said drive gear 232 and spin in a reverse direction relative to the gear 232 owing to the transmission engagement therebetween; by electrical switch means, the direction of rotation of said drive gear 232 of said drive disk member 23 can be changed (the electrical switch means is detailed later), and the shiftable idler 51 can selectively engage with the driven gear 241 or 251 by selectively shifting to the right or left so that the forward or backward winding of the magnetic tape in an alternative manner becomes possible.

In order to make the idly rotating shiftable idler 51 firmly and effectively engage with either driven gear 241 or 251, a pressing arm 6 is adopted, which has a vertical pole 61 at one end and located in the opening 3A on said slide board 3 for confining purpose, and a hole 63 is set at the middle thereof so that said pressing arm 6 can be pivotably fixed on the surface of said base 2; and on the other end thereof is provided a pressing gear 62 under which is placed an annular push spring 621 for increasing the inertia of rotation of said gear 62. A twisting spring 64, with its two ends connected to the relative ends of said pressing arm 6, is located at the pivot center thereof so to produce a forward orienting force on said pressing arm 6, causing the pressing gear 62 to disengage from said shiftable idler 51 (see FIG. 7-A), and the disengagement is limited in a proper range by said opening 3A on said slide board 3.

When said slide board 3 is in a forward motion, the vertical pole 61 of said pressing arm 6 is pushed to move along by the edge of said opening 3A so to cause the other end provided with said pressing gear 62 to pivot in a reverse direction and engage with said shiftable idler 51. Owing to the confinement of said opening 3A to said vertical pole 61, the pressing gear 62 is surely and firmly engaged with said shiftable idler 51, and in the event of the idler 51 being spinned in a clockwise direction, the center of the idler 51 is naturally shifted to the right so to permit the same to engage with the driven gear 251 disposed under the right reel 25 to backward wind the magnetic tape. In the other event that the idler 51 is driven to spin in a counter-clockwise direction, the center of the same is naturally shifted to the left, allowing said idler 51 to engage with the driven gear 241 disposed under the left reel 24 and make the same to clockwisely rotate so to forwardly wind said magnetic tape; the above-noted movement comes into effect only with the adoption of an electrical switching means which permits the driving motor 21 to spin either clockwise or counter-clockwise as shown in FIG. 7-B.

Referring to FIG. 7-A, the device is in a stop state, and the slide board 3 is moved backward, i.e., in a direction indicated by the arrow, and the vertically-erected guide pole 52 on the gear mounting means 5 is pushed and slides into the front recess portion of said movement confining opening 39, disposed on the roof of said convex tunnel-like structure 38, and maintained in that place, in such a manner that the shiftable idler 51 is made to disengage from both the driven gears 241 and 251 and keep in a neutral position, placing the device in an in-operative state, that is, the winding action on the magnetic tape is stopped.

Continuing to refer to FIGS. 1 and 2, FIGS. 4-A and 4-B, the cassette-mounting seat 4 consists of three arcuate movement-limiting slots, a start button 42, a pressing key 43, four-way operation element 44, a stop button 45, and moreover, on the left and right side of the seat 4, an L-shaped stop block 46 is symmetrically located respectively for fixing an inserted cassette place readily; a cut 461 is provided at the middle of each stop block 46 for readily removing a located cassette with the fingers. On the plane of said cassette-mounting seat 2, a pair of circular holes 47 are symmetrically disposed for the location of said left and right reel 24, 25, the vertical axes of which are first penetrated through the oval-shaped openings 3B on the slide board 3 so that the reel 24 and 25 can engage with the tape cassette R for winding purpose; in order to fix a tape cassette R firmly in place during a tape winding operation, an opening 481 is set respectively on the wall of said cassette stop block 46 at the end thereof so that a spring-biased cassette-fixing element 48 having its embodiment pivotably secured to the side wall of said cassette mounting seat 4 and its lock tip 482 sticking out of said opening 481 in a resilient manner due to a spring 483 so that said lock tip 482 can removably engage with the bottom flange of a recessed portion R2 of a cassette as shown in FIG. 4-A. Furthermore, an elongate restraining pin 484, extending from the bottom of said lock tip 482, is placed in the opening 3C on the slide board 3, which is defined to have a trapezoid shape, in such way that said restraining pin 484 is able to sway in the wider portion of said opening 3C as shown in FIG. 4-C when said slide board 3 is not moved forward, so that an 8-mm tape cassette R can be located therein or removed therefrom at disposal at this stage.

During a tape-winding operation, tape cassette R must be firmly held in place, and the locking is achieved by means of said lock tip 482 of said cassette-fixing hook 48, engaging with the flange of said cassette R, at the moment the slide board 3 is being moved forward and the restraining pin 484 falls into the rear narrowed portion of said opening 3C at the place where the pin 484 is restrained from swaying away so to lock said hook 482 in place as shown in FIG. 4-D, preventing said cassette R from being taken out of said mounting seat 4 by accident in operation; and the cassette R can be released therefrom only at the moment that the slide board 3 moves backward to its original position. Thus a protective mechanism is provided to ensure a safe operation.

Next to the leftmost and rightmost arcuate movement-limiting slots 41, and in front of a placed tape cassette R, a hole 491 is disposed respectively on the cassette mounting seat 4 for location of a hook-ended lock tip 492 of a detent element 49 which is attached with a bias spring 493 so that it can be resiliently and pivotably operable to engage with the front flange of a located cassette in cooperation with said stop blocks 46 as well as said cassette fixing hook 48 so to firmly fix said cassette in place from every way.

Designing in view of the structural features of a typical 8-mm tape cassette which has a release hole set at the middle of the bottom thereof, and a cassette-release actuation key disposed at the front side of the left portion, a protrudent pin element 4A is correspondingly planted at the middle of said cassette-mounting seat 4 for said release hole, along with an end-bended push pin 462 disposed in a recess on the wall of said stop block 46, and a cassette-opening means 4C is also provided so that a series of moves can be accomplished to open the cassette when it is placed on said mounting seat 4. However, those elements, including said pin element 4A, stop block 46, cassette-opening means 4C, are defined in accordance with the structure of a conventional tape cassette and not included as an inventive part of the present invention.

A specially-designed automatic switch means must be provided to achieve the previously-described operational moves which include the selection of clockwise or counter-clockwise winding of the magnetic tape after said slide board 3 is pushed forward, and the supply of power to make a section of the out-pushed tape be received orderly back into a tape cassette when said slide board 3 is moved backward and before the winding device is stopped, and the assurance of a clockwise rotation of the drive gear engaging with said rack member 34 for moving said slide board 3 before the selection of clockwise or counter-clockwise rotation of the magnetic tape is made, a start switch SW1, a slight-motion switch SW2 and a selection switch SW3 are located at those places within the range of the swing motion of said rack member 34 and along the route of the linear motion of said slide board 3, so to achieve automatic control on the operation of a DC motor 21 during the above-described motions; the electric circuit and operation modes thereof are illustrated in FIGS. 8-A, 8-B and FIGS. 9-A, 9-B and 9-C A sequence control circuit is designed especially for the winding operation on an 8-mm cassette wherein a section of the magnectic tape must be pushed out first, thereby a sequence of operations ensure including: start of the device, out-pushing a section of magnetic tape, selection of tape-winding direction, stop of the device and cut off power supply can be achieved automatically; wherein said start switch SW1 is located near the back side of said rack member 34 so that the resilient switching member A of said SW1 can be actuated, due to the moving of said rack member 34, to make a selective contact between position 0 or position N in the power supply, as shown in FIGS. 8-A and 8-B; slight-motion start switch SW2 is fixedly planted on said base 2 disposed under said slide board 3, and can be actuated by a protruding spot B located in front of said switch SW2 on the slide board 3 being pushed forward so to put said switch SW2 in an "on" state as shown in FIG. 8-B, and before the moving of said slide board 3, the switch SW2 is kept in an "off" state as shown in FIG. 8-A.

As shown in FIG. 9-A, prior to the depression of the start button, i.e., the device being in a "power-off" state, the switch SW1 is kept in the "O" position as illustrated in FIG. 6-A, and at the same time, the slight-motion switch SW2 is in an "off" position, and the slide board 3 is at the moment not moved. After the start button being depressed, the rack member 34 is actuated by said pressing key 43 to swing close to drive gear 223, causing said start switch SW1, located at the side of said rack member 34 to protrude as shown in FIG. 8-B so to put the SW1 into an "N" state, as shown in FIG. 9-B, and the mechanical operation is illustrated in FIG. 6-B, therefore the motor 21 is clockwise driven by a fixed power source, (the slight-motion switch SW2 being in an "off" state, so the switch SW3 is not working), so the slide board 3 is forward pushed. At the moment the keyway 344, located at the end and on one side of said rack member, engages with the side of said pressing key 43, the reversely-pushed rack member 34 then turns said switch SW1 into the "O" position; in the meantime, the slide board 3 has been forward moved from its original position to a new position and fixed in place thereat, causing said switch SW2 shift to an "on" state by means of said protruding spot B, as shown in FIG. 8-B, FIG. 9-C, and FIG. 6-C in which the mechanical moves are illustrated, at the moment the tape-push move has been accomplished; in the meanwhile, electric power, going through the switch SW2 and switch SW3, is supplied for the clockwise or counter-clockwise drive of said motor 21, which direction is determined by said switch SW3, thereby the cassette tape can be forward or backward drawn.

Either in case that the tape-winding performance is accomplished, the device is automatically stopped, or in case that the device is manually stopped, the rack member 34 disengages automatically from the locking restraint of said pressing key 43, permitting said slide board 3 to resiliently move: :back to its inopertive position; the ultimate position is shown in FIG. 9-A, and in the process of the above-noted move of said slide board 3, the slight-motion switch SW2 is gradually released and before it reaches the final "off" state, the electric power can be continuously supplied for a short period of time so that a section of out-pushed tape R1 can be drawn back into the tape cassette at the time of said tape-push elbow arm 32 assuming its inoperative position. Until then the power is totally turned off as shown in FIG. A, thereby said magnetic tape R1 can be effectively protected; the mechanical moves thereof are illustrated in FIG. 6-D.

I claim:

1. A mono-motor driven, bi-directionally operable, 8-mm video tape-winding device mainly consisting of:
 a base which is a square concave casing containing a drive motor located at the right upper corner thereof, coupled by belt to a relay drive means disposed approximately near the center thereof; said relay drive means consists of a 3-stage structure, a bottom stage of which is directly connected to said motor by a belt so that power can be transmitted thereby, a drive gear mounted thereon, and the middle stage thereof being connected, also by a belt, to a drive disk memgber located at the middle of the rear portion of said casing so that said drive disk member an be rotated synchronously, sand drive disk member consisting of a drive member located at the bottom thereof to which a transmission belt is attached, and a drive gear disposed at the top thereof in such a manner that said tape winding device is able to be operated only by a single motor; a pair of left and right reels vertically located in front of said drive disk member in a symmetry manner, and a driven gear respectively placed under each said reel and in front of said drive gear of said drive disk member;
 a slide board forward and backward moveably disposed on top of said base 2, which is in a square form; a pair of elongated openings for the penetration of said tape-winding reels, palced in symmetry at the middle section thereof; a protrusion at the middle of the front side thereof adapted for the pivotal location of a rack member which is defined in an elongate form, one end of which is used as a mechanical actuation portion and the other end having one side thereof provided with geared surface as a engaging means with said drive gear of said relay drive means; the opposite side of the geared surface of said rack member being attached to a spring which exerts pull force thereon so to disengage the geared surface thereof from said drive gear as long as the other actuation end of said rack member is not pivotally pushed; and a recessed keyway provided near said actuation end and on the same side of said geared surface; between said two elongated reel-through openings on said slide board, there being disposed a convex tunnel-like structure on the roof of which is place d a movement-confining opening so that a shiftable idler can be controllably moved to the left or right; said shiftable idler being disposed under a pivotably-planted gear mounting means which is attached to the protruding axis of said drive disk member by means of a axis-through hole located at the opposite end thereof, in such a manner that said shiftable idler can engage with the drive gear of said drive disk member and be driven in reverse direction relative to said drive gear 232; said shiftable idler being placed between the driven gears 241 and 251 of said left and right reels so that it can be selectively moved to engage with one of said gears one at a time for clockwise or counter-clockwise winding of a tape cassette; a vertically-erected guide pole at one end of said gear mounting means, disposed in said movement-confining opening of said tunnel-like structure so that said shiftable idler can be guided to be selectively in engagement with one of said driven gears 241, 251 for achieving clockwise or counter-clockwise winding of a cassette during the forward or backward movement of said slide board; a pressing arm for urging the shiftable idler to become firmly engaged with one of said driven gear, and located in front of said shiftable idler, a hole in said pressing arm for pivotable fixing thereof to said base, and a vertical fixing pin in an elongated slot 3A on said slide board so to guide the motion of said pressing arm; said pressing arm being equipped at its other end with a constraint gear having an annular push spring placed thereunder for increasing spinning inertia; and a twisting spring attached to the pivot of said pressing arm for providing a constant exertion force thereon so to tend to make said constraint gear disengage from said shiftable idler; whereby at the moment the slide board is pushed forward, said vertical fixing pin located at one end of said pressing arm, being constrainedly planted in said slot 3A, is urged thereby to move so to pivotally push said constraint gear to engage with said shiftable idler for operation, and said shiftable idler is forced to make a selective engagement with one of the left or right driven gear of said left or right reel, depending on the clockwise or counter-clockwise rotation thereof so to effect the purpose of forward or backward winding the cassette tape; on each side of said slide board there being disposed respectively a hook element for symmetric installation of a spring which is attached to the rear wall of said base with one end thereof and with the other end to said hook element so to provide a pull force on said slide board and make the same assume its original inoperative position when said slide board is released from a constraint position; three arcuate movement-limiting slots being provided on said slide board for constraining the movement of three tape-push elbow arms;

a cassette-mounting seat adapted to accommodate an 8-mm cassette thereon for tape-winding operation and secured on the top of said base, provided with a rised control platform at the front thereof and a seat occupying the rest thereof; a pair of symmetrically-disposed reel-through holes for the penetrating location of said right and left reels disposed on said base and operating in cooperation with the mechanism set therearound so to enable to clockwise or counter-clockwise winding of a located cassette tape; three arcuately-shaped movement-confining slots arranged thereon in such a manner that the exposed magnetic tape on a mounted cassette is located near the rear end of said arcuate slots and just before three vertically-erected push poles, each attached with sleeve element, of the tape-push elbow arms; said tape-push elbow arm being constructed in a flexed form with a hole set at one end thereof for pivotally fixing said elbow arm to the underside of said mounting seat and a downward protruding pin at the bottom side thereof, said pin being constrainedly located in a correspondingly set opening on said slide board so that said elbow arm can be actuated to pivotally move in synchronism with said moving slide board 3, causing said tape-push pole, attached with sleeve element and fixed at the other end of said elbow arm, to move forward in said arcuated-shaped movement-confining slot so to push a section of the magnetic tape out of said cassette disposed in place on said cassette mounting seat, and permitting said out-pushed tape to be redrawn into said cassette when said slide board is moved in a reverse direction with said elbow arm resuming its inoperative position; a resiliently operable start button set on said highly rised control platform disposed at the front of said cassette mounting seat and having a downward extended pressing key attached thereunder, said key being an obliquely-shaped facet at the bottom thereof in abutting engagement with one side of said rack member at the end opposite to the geared end so that said pressing key can push said rack member to pivotably move when said start button is depressed, thereby causing the geared end of said rack member in engagement with the gear 223 located at the top of said relay drive means to make said slide board move continuously forward until one side of said pressing key falls into a keyway placed at the opposite end of the geared end of said rack member, locking said slide board in place, or in the event of said pressing key being released from its depressed position to free said rack member from the engagement with said gear 223, causing said slide board to resume its operative position by said said springs attached thereto; a keyway 432 at the other side of said pressing key at the middle thereof; a four-way operation element pivotably mounted on a vertical pole disposed on said base and placed under said cassette-mounting seat, wherein said four-way operation element is provided with a center hole for pivotal positioning on said vertical pole on said base, and a spring is attached to one branch of said operation element with one of its end and the other end thereof hooked to the side wall of said base, so to make one of the detente branch of said four-way operation element tend to pressingly bear against said pressing key located under said start button, whereby said horizontally-disposed detente branch can fall into said recessed keyway disposed on one side of said pressing key on said key being depressed to a proper extent so to lock said pressing key in place; means to effect stopping of the tape-winding operation in the middle thereof including a horizontally disposed and highly rised actuation stick 445 constituting one branch of said four-way operation element which can be actuated to pivotally move as long as a resiliently-operable key located under said stop button being depressed, so to release said locked pressing key from said detente branch; a vertical tape-abutting pole, disposed at one branch of said four-way operation element, on which a sleeve is attached, and located outside an opening on the wall of said raised control platform and disposed in front of said arcuate movement-confining slot so that the fully rewound tape can push said four-way operation element back to terminate the winding operation by means of the excessively tensioned tape;

and a D-C selective switching circuit, whereby the tape winding device is able to perform the operations of tape out-pushing, forward or backward winding the same, automatic or manual stop, drawing back out-pushed tape and release of the cassette for an 8-mm video tape cassette.

2. a mono-motor driven, bi-directinally operable, 8-mm video tape-winding device as claimed in claim 1, wherein the slide board is movably attached to the top of said base by way of four or more sets of vertically-planted supporting means located on two sides of said base, each set of said supporting means includes a support element and a restraint element located in juxtaposition with each other; said restraint element is shaped in a reversed-L form and said support element is defined to have a cutaway portion for horizontal location of the edge of said slide board so that the same can be restrainedly and slidably move thereby.

3. a mono-motor driven, bi-directionally operable, 8-mm video tape-winding device as claimed in claim 1, wherein at least two symmetrically and oppositely disposed L-shaped cassette stop blocks are planted at two sides of said cassette-mounting seat for limiting a located cassette in place without shaking in operation, and a cutaway is defined at the middle of said L-shaped stop block for ready hold of a located cassette by fingers.

4. a mono-motor driven, bi-directionally operable, 8-mm video tape-winding device as claimed in claim 1, wherein an opening is set on each inner wall of said L-shaped stop blocks disposed on left and right edge of said cassette mounting seat so that a lock tip of a pivotably operated cassette-fixing hook can go therethrough to engage with the flange of a grooved recess of a located tape cassette; said cassette-fixing hook is provided with a bias spring so that the same can be resiliently operable, and with a restraining pin at the bottom, which is disposed in a trapezoid-shaped opening on said slide board, by means of the defined contour of the same, the cassette-fixing hook can function in synchronism with said forward or backward moving slide board so to assure the fixing of a tape cassette in operation.

5. a mono-motor driven, bi-directionally operable, 8-mm video tape-winding device as claimed in claim 1, wherein a cassette-fixing hook 49, pivotably attached to the underside of said cassette-mounting seat, resiliently operable by means of a bias spring 493, which has a lock tip penetratingly disposed through an opening set at the uppermost left corner of said cassette-mounting seat so that a placed tape cassette can be fixed in place with said lock tip engaging with the flange of said cassette.

6. a mono-motor driven, bi-directinally operable, 8-mm video tape-winding device as claimed in claim 1, wherein a D-C electric circuit means, which is characterized by its automatic selection and switching features is adopted in cooperation with the above-described mechanism so to effect the automatic tape-winding operation, and consists of a start switch, a slight-motion switch and a power-selection switch which are in control of a D-C motor; said start switch being located on the opposite side of the geared surface of said rack member pivotably disposed under the front portion of said slide board so that when said start button is depressed, the pressing key planted thereunder can actuate said rack member to pivot in either direction so to make said switch shift either to an "O" position in which the motor is powered to rotate in one direction, causing said slide board to move, or to an "N" position in which the switch is in an "on" state; said slight-motion switch under said slide board having a fixed protrudent spot located at the side of said slight motion switch so that said switch is kept in an "off" state before the movement of said slide board, and switched to an "on" state by said protrudent spot when said slide board is moving forward, resulting from said rack member being actuated to move and causing said motor to rotate in a particular direction, and the device being able to clockwise or counter clockwise operate to wind a tape cassette when the power-direction selection is accordingly made.

* * * * *